May 14, 1940.                L. R. LUDWIG                2,201,007
                          VAPOR ELECTRIC DEVICE
                         Filed Aug. 17, 1938          2 Sheets-Sheet 1

WITNESSES:                              INVENTOR
                                        Leon R. Ludwig.
                                        BY
                                        ATTORNEY

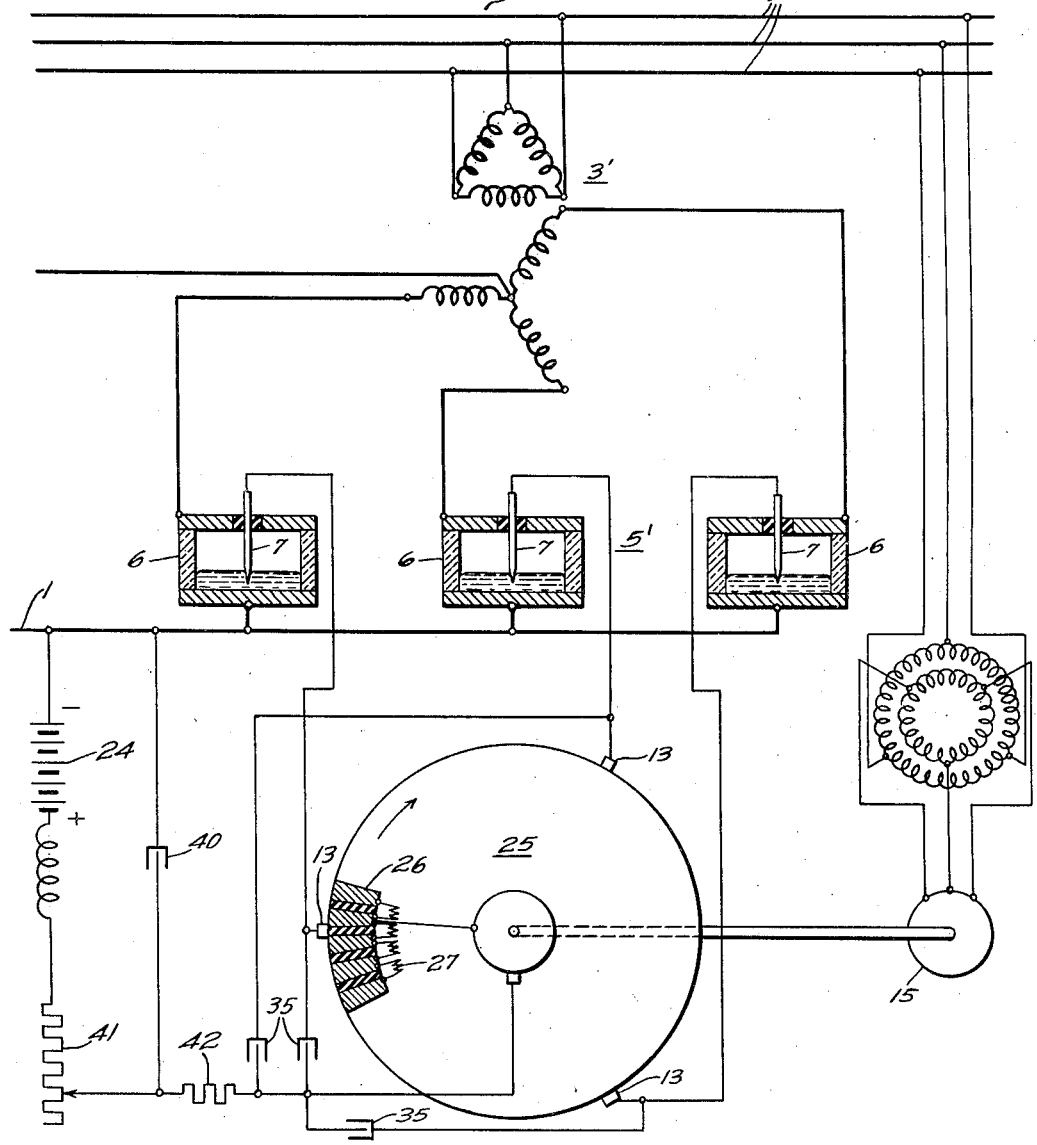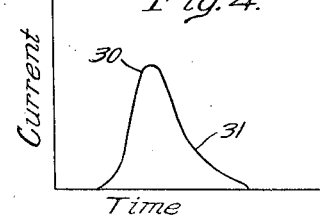

Patented May 14, 1940

2,201,007

UNITED STATES PATENT OFFICE 2,201,007

VAPOR ELECTRIC DEVICE

Leon R. Ludwig, Wilkinsburg, Pa., assignor to Westinghouse Electric & Manufacturing Company, East Pittsburgh, Pa., a corporation of Pennsylvania Application August 17, 1938, Serial No. 225,377

7 Claims. (Cl. 175—363)

My invention relates to a vapor electric device and particularly to a control system for increasing the stability of a make-alive type converter.

In the operation of vapor electric converters comprising a plurality of make-alive type electric valves, the control circuits for supplying the actuating current to the make-alive electrodes have sometimes given difficulty, resulting in faulty or undesirable operation of the converter.

When, as has heretofore been customary, anode firing is utilized for energizing the make-alive electrodes, that is, when the make-alive electrodes of the individual converter valves are connected to the corresponding anodes through a suitable control circuit, difficulty has been experienced for several reasons. If the main anode should wholly or partially fail to pick up, the load current will tend to flow through the control circuit, resulting in damage to the control devices, or if electronic control devices are utilized in the make-alive circuit, arc-back of the control device may result in arc-back of the main valve.

The effect of arc-backs in the control circuit may be eliminated by utilizing mechanical control devices, but the control circuit requires considerable energy and the constant making and breaking of the control current results in short life of the contact elements. Further, when such converters are operated inverted, the commutating capacitors tend to discharge through the control apparatus which may cause failure of commutation and consequent failure of operation.

These difficulties are avoided according to my invention by utilizing an independent source of excitation for the make-alive electrodes and providing means for terminating or reducing the current flow prior to operation of the control switches, so that there will be substantially no burning of the contact elements.

In inverters operating at medium or low voltages, the direct current circuit may be conveniently utilized as a source of exciting current for the make-alive electrodes. However, in rectifiers or in inverters operating at an undesirably high direct current potential, an auxiliary or independent direct current source may be conveniently applied.

The make-alive current may be controlled by means of suitable impedances placed in the control circuit for determining or controlling the rate of flow of the current to the make-alive electrode. This impedance may be either in the form of a variable resistance or in the form of a capacitor connected in series with the make-alive electrode. When a capacitor is connected in series with the make-alive electrode, the exciting current is then the charging current of the capacitor and when the capacitor is fully charged current will substantially cease to flow to the make-alive electrode, and the control device will then be timed to operate after the termination of current flow. When a variable resistor is utilized to control the current flow, the resistor may conveniently be formed as a member of a rotating contact device, the contact element being formed as a variable resistance, so that both the rate of the rise of current and the rate of decrease of current as well as the total current may be conveniently controlled.

It is accordingly an object of my invention to provide a control system independent of the alternating current terminals of the converter.

It is a further object of my invention to provide a control system in which the current flow may be substantially terminated prior to opening of the control contacts.

It is a further object of my invention to provide a control system in which the rate of current flow to the make-alive electrode can be conveniently controlled.

Other objects and advantages of my invention will be apparent from the following detailed description, taken in conjunction with the accompanying drawings, in which:

Fig. 3 is a further modification of a converter according to my invention; and

Fig. 4 is a diagrammatic illustration of a preferred current application.

Figure 1:
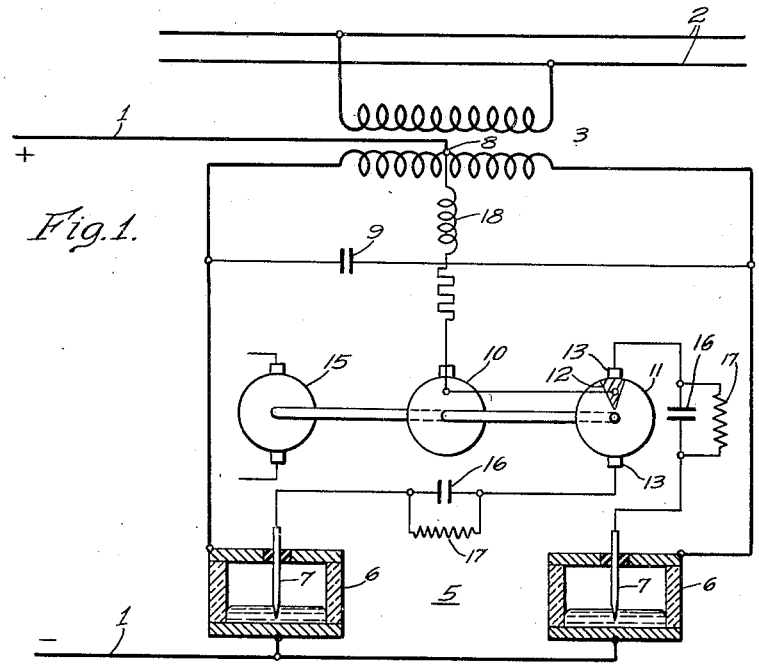
Figure 1 is a schematic illustration of a converter according to my invention.

In the illustrated embodiment of my invention according to Figure 1, a direct circuit I is connected to an alternating current circuit 2 by means of a suitable inductive device herein illustrated as a transformer 3. Current flow between the alternating current 2 and direct current circuit I is controlled by means of a vapor electric device 5 comprising a plurality of make-alive type valves 6 connected to the phase terminals of the transformer 3, commutation between the phase terminals of the transformer 3 being accomplished by means of a suitable commutating capacitor 9. The make-alive electrodes 7 of each of the valves 6 are connected to the positive terminal 8 of the direct current circuit I by means of a suitable contact device herein illustrated as a commutator type contactor 10 comprising a rotating element 11 having one terminal 12 connected to the positive terminal 8 of the direct current circuit and a plurality of stationary contact elements 13 connected to the individual make-alive electrodes 7. The contactor 10 may be conveniently operated by a suitable motor 15, preferably operating in synchronism with the alternating current circuit 2. A capacitor 16 is connected in series with each of the make-alive electrodes 7, each of the capacitors 16 being provided with a discharge resistance 17, so that the charge of the capacitor 16 may be dissipated. A suitable reactance 18 may be provided in the control circuit to control the rate of rise of the make-alive current.

In operation, the contact element 12 and the contact device 10 make contact with one of the stationary contacts 13 so that current flows from the positive terminal 8 of the direct current circuit 1 through the contactor 10 to the make-alive electrode 7. The rate of rise of the current flow to the make-alive electrode 7 will be controlled by the series reactance 18, while the length or duration of current flow will be determined by the capacity of the series capacitor 16. It will thus be seen that because of the impedance, relatively little current will flow at the instant of the make of the contact 12 and the series capacitor 16 can substantially terminate the current except the current through the resistor 17 prior to the opening of the contact elements 12 and 13, so that at the opening and closing of the contact elements, there will be little or no current flowing so that there will be substantially no tendency to burn or otherwise damage the contact elements.

The discharge resistance 17 connected in shunt with the capacitor 16 will discharge the capacitor 16, so that when the next conducting interval arrives, the capacitor 16 will again be in condition to receive the flow of make-alive current.

Figure 2:
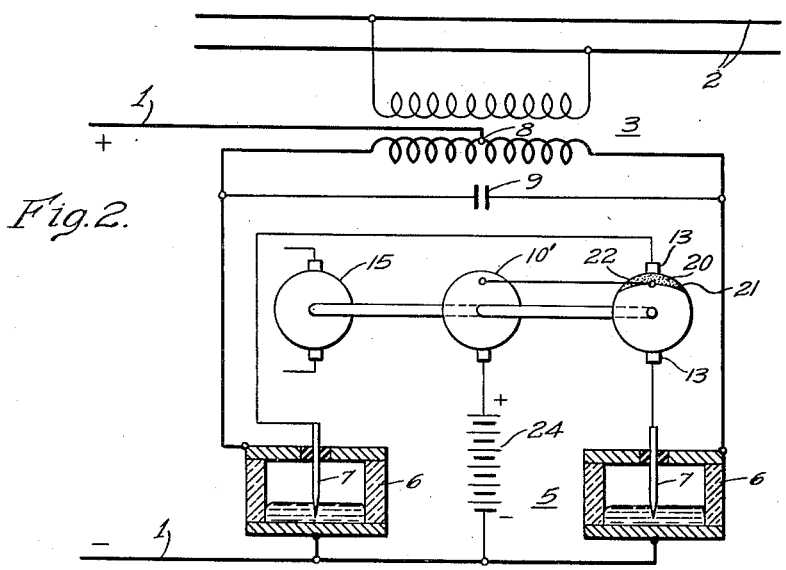
Fig. 2 is a modification according to my invention.

In the modification according to Fig. 2, the impedance is in the form of a resistor element, the resistance of which will be varied during the contact interval. The resistor element is conveniently formed as one of the contact elements herein illustrated as a segment 20 of a rotary contactor 10', the segment 20 being formed of resistance material having tapered end-sections 21—22 and a relatively thick intermediate section to which the direct current potential is connected. While this direct current may be the positive terminal 8 on the direct current circuit 1, such as illustrated in Fig. 2, it may, in the event it is undesirable to use the direct current circuit 1, be an auxiliary source of direct current such as the battery 24 or other source of potential.

In the operation of this circuit, a contact is made at the leading edge 21 with a relatively high resistance so that only a small current flows at the instant of make. However, as the contact element 13 approaches the center of the segment 20, relatively small resistance is inserted in the circuit so that the relatively high make-alive current flows during this instant, and then as the trailing edge 22 of the contact element 20 is of high resistance, the break will be made after the resistance has reduced the current to a relatively low value.

In the modification according to Fig. 3, the direct current circuit is connected to the alternating current circuit 2' by means of a suitable inductive device 3', while the transfer of energy through the inductive device 3' is controlled by means of the converter 5' having a plurality of make-alive type valves 6, each of the valves 6 having a make-alive electrode 7. The make-alive electrodes 7 are successively connected to the direct current source 24 by a suitable contact device 25 which includes an impedance device for regulating the rate and duration of current flow to the make-alive electrodes 7.

The contact device comprises a movable contact which may conveniently be a standard commutator having a plurality of segments 26 connected together by resistance elements 27 to provide the movable contact element while the stationary contacts 13 may very well be ordinary carbon brushes or the like riding in contact with the periphery of the commutator and spaced apart the desired distance. The duration of current flow to the make-alive electrode 7 is then determined by the contact time which is dependent upon the number of commutator segments connected together while the shape of the applied current impulse is determined by the point at which the source 24 is connected to the contact element. It is normally preferred to apply an impulse having a steeply rising front 30 of considerable amplitude and a gradually diminishing tail 31 so that the high impulse 30 will initiate the cathode spot and the tail 31 will maintain the spot if necessary until the main anode picks up. This impulse shape as shown in Fig. 4 is readily obtained by attaching the source 24 to a segment 26 near or at the leading edge of the contact element.

While the impedances 27 will usually reduce the current to a value low enough to prevent undue erosion of the contact elements, it may be desirable in certain instances to still further reduce the sparking at the contacts and this may be done by connecting capacitors 35 across the contact elements. The capacitors 35 should be connected with as short leads as possible to eliminate the inductance as far as possible and thus secure maximum efficiency of the capacitors.

The capacity of the source 24 can be materially reduced by providing a capacitor 40 which is charged through a resistor 41 and discharges through a smaller resistor 42 so that the peak currents are supplied from the capacitor 40 whereby the source 24 can supply a substantially lower current of relatively constant value.

While for purposes of illustration, I have shown and described specific embodiments of my invention, it will be apparent that many changes and modifications can be made therein without departing from the true spirit of my invention or the scope of the appended claims.

I claim as my invention:

1. An electrical conversion system comprising a direct current circuit, an alternating current circuit, an inductive winding device connecting said circuits, a multi-valve arc discharge device for transferring energy between said circuits, a make-alive electrode in each of said valves, a source of direct current actuating potential for said make-alive electrodes, circuit interrupting means for periodically impressing said actuating potential on make-alive electrodes, means in series with said make-alive electrode for reducing current flow thereto prior to the opening of said circuit interrupting means.

2. An electrical conversion system comprising a direct current circuit, an alternating current circuit, an inductive winding device connecting said circuits, a multi-valve arc discharge device for transferring energy between said circuits, a make-alive electrode in each of said valves, a source of direct current actuating potential for said make-alive electrodes, circuit interrupting means for periodically impressing said actuating potential on the make-alive electrodes, and means included in said circuit for controlling the rate of change of current flow to said make-alive electrode.

3. In an arc discharge device of the make-alive type, a control system comprising a make-alive electrode, a source of actuating current for said electrode, a circuit connecting said source to said electrode, a rotating contactor in said circuit, said contactor having an insulating portion and a conducting portion, said conducting portion having a high resistance at the leading and trailing ends merging into a relatively low resistance at an intermediate portion thereof whereby the current to the electrode increases to a maximum and decreases to a value small enough to be interrupted without damaging said contactor.

4. In a vapor-electric device of the make-alive type, an excitation system comprising a make-alive electrode for said device, a source of unidirectional actuating current for said electrode, a circuit for connecting said source to said electrode, a switching device in said circuit for periodically closing and opening said circuit, means in said circuit for controlling the rate of rise of current flow upon the closing of said circuit and means in said circuit for substantially terminating current flow therein prior to opening of said circuit by said switching device.

5. In a vapor-electric device of the make-alive type, an excitation system comprising a make-alive electrode for said device, a source of unidirectional actuating current for said electrode, a circuit for connecting said source to said electrode, a switching device in said circuit for periodically closing and opening said circuit, means in said circuit for controlling the rate of rise of current flow upon the closing of said circuit and a capacitor connected in series with said circuit for substantially interrupting current flow in said circuit independently of said switching device.

6. A control system for supplying actuating potential to the make-alive electrode of a make-alive type converter comprising a source of actuating potential, circuit means for supplying potential from said source to said make-alive electrodes, a contact device in said circuit means including a contact element composed of a plurality of segments, and impedance means connecting said segments for controlling the shape of the potential impulse applied to the make-alive electrodes, a driving motor for said contact device and means for adjusting the phase relation of said driving motor.

7. A system for supplying actuating potential to the make-alive electrodes of a make-alive type device comprising a source of actuating potential, circuit means for supplying potential from said source to the make-alive electrodes, a rotating contactor for sequentially connecting said source to said circuit means, said rotating contactor including a contact element made up of a plurality of spaced apart segments, said segments sequentially making engagement with a cooperating contact element and impedance means connected between said segments, and capacitor means connected across said contact elements.

LEON R. LUDWIG.